US006997469B2

(12) United States Patent
Lanoue et al.

(10) Patent No.: US 6,997,469 B2
(45) Date of Patent: Feb. 14, 2006

(54) MOLDED RUNNING BOARD

(75) Inventors: Michel Lanoue, Pintendre (CA);
Normand Mercier, Saint-Damien (CA);
Philippe Bégin, Pintendre (CA)

(73) Assignee: Decoma International, Inc., Concord (CA)

( * ) Notice: Subject to any disclaimer, the term of this patent is extended or adjusted under 35 U.S.C. 154(b) by 0 days.

(21) Appl. No.: 10/163,446

(22) Filed: Jun. 4, 2002

(65) Prior Publication Data

US 2003/0006576 A1    Jan. 9, 2003

(30) Foreign Application Priority Data

Jun. 4, 2001    (CA)    .................................... 2349517

(51) Int. Cl.
*B60R 3/00* (2006.01)

(52) U.S. Cl. ...................................... 280/163; 280/169
(58) Field of Classification Search ................ 280/163, 280/169, 164.1, 164.2, 166, 762, 770, 1
See application file for complete search history.

(56) References Cited

U.S. PATENT DOCUMENTS

| 3,620,875 | A | * | 11/1971 | Guglielmo et al. ...... 156/272.4 |
| 4,710,539 | A | * | 12/1987 | Siadat et al. .................. 525/59 |
| 5,193,829 | A | * | 3/1993 | Holloway et al. .......... 280/163 |
| 5,685,561 | A | * | 11/1997 | Kauer ......................... 280/731 |
| 5,713,589 | A | * | 2/1998 | Delgado et al. ............ 280/163 |
| 5,769,439 | A | * | 6/1998 | Thompson ................... 280/163 |
| 6,050,579 | A | * | 4/2000 | Selland et al. .............. 280/163 |
| 6,173,979 | B1 | * | 1/2001 | Bernard ...................... 280/163 |
| 6,412,799 | B1 | * | 7/2002 | Schrempf ................... 280/163 |
| 6,513,821 | B1 | * | 2/2003 | Heil ........................... 280/169 |
| 6,581,946 | B1 | * | 6/2003 | Lund et al. ................. 280/163 |
| 6,588,781 | B1 | * | 7/2003 | Pohill et al. ................ 280/163 |
| 6,588,782 | B1 | * | 7/2003 | Coomber et al. ........... 280/163 |
| 6,592,174 | B1 | * | 7/2003 | Rollin et al. ........... 296/190.08 |
| 6,692,064 | B1 | * | 2/2004 | Porter ................... 296/187.01 |
| 6,709,137 | B1 | * | 3/2004 | Glovak et al. .............. 362/495 |

* cited by examiner

*Primary Examiner*—Christopher P. Ellis
*Assistant Examiner*—Brian Swenson
(74) *Attorney, Agent, or Firm*—Merchant & Gould P.C.

(57) ABSTRACT

A molded running board provided with a support portion and a top portion is described herein. The support portion is made of plastic material and provided with reinforcing ribs and the top portion is made of a plastic material that is advantageously compatible with the plastic material forming the support portion. A method for the assembly of such a molded running board is also described herein. This method includes the welding of a top portion to a support portion via the use of a thin strand of plastic material compatible with material used in the top portion and the support portion and metallic particles in an electromagnetic press, for example.

30 Claims, 9 Drawing Sheets

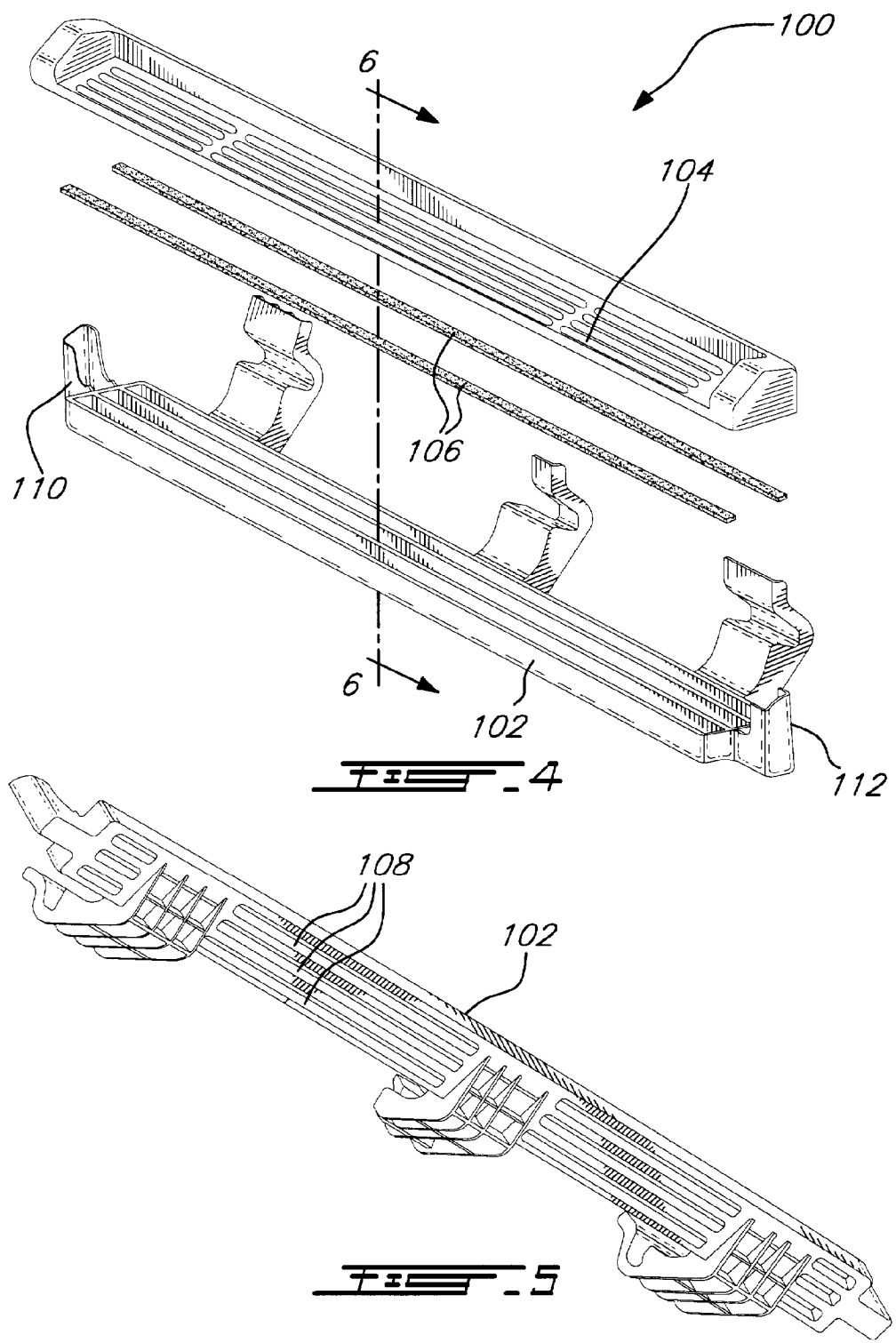

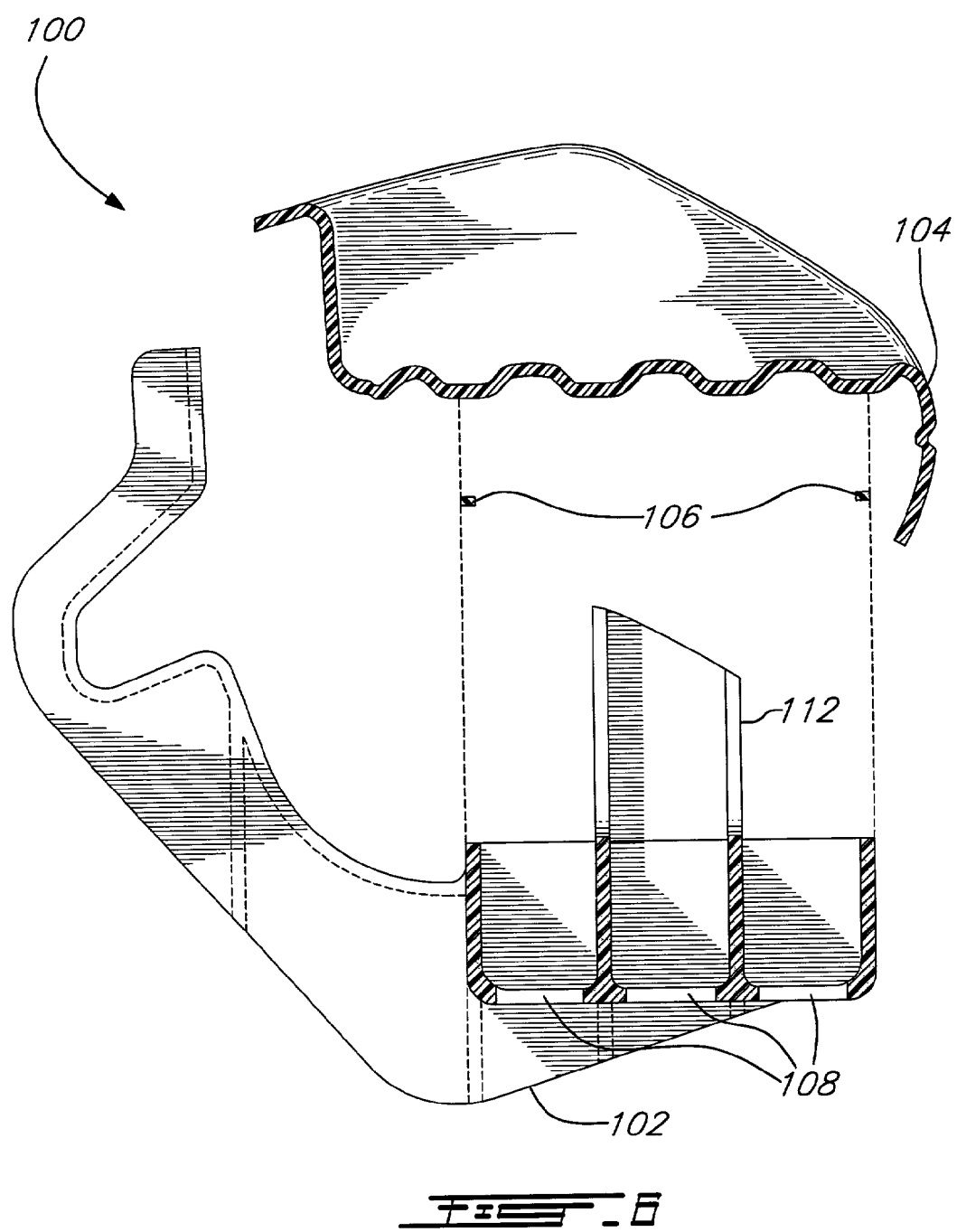

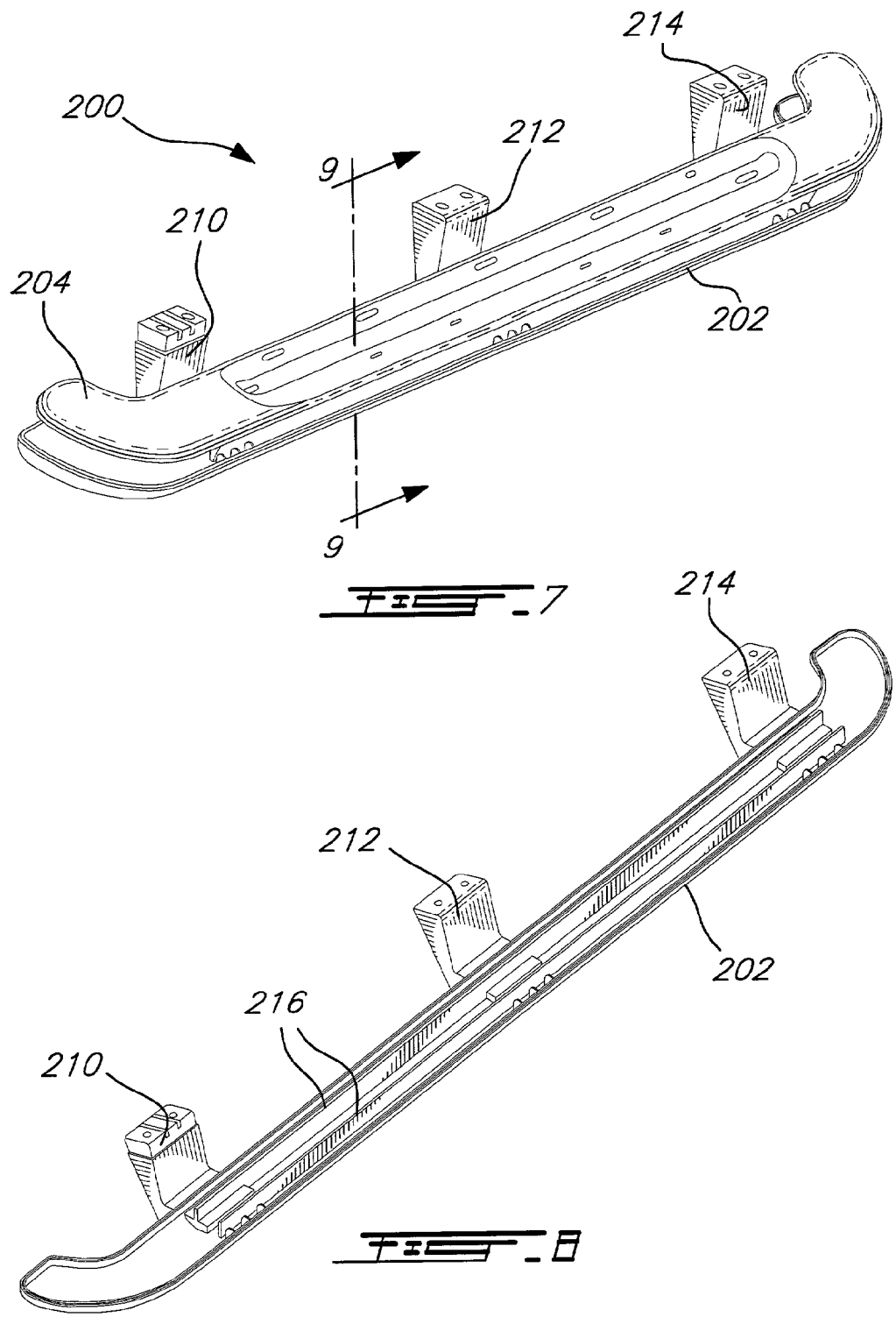

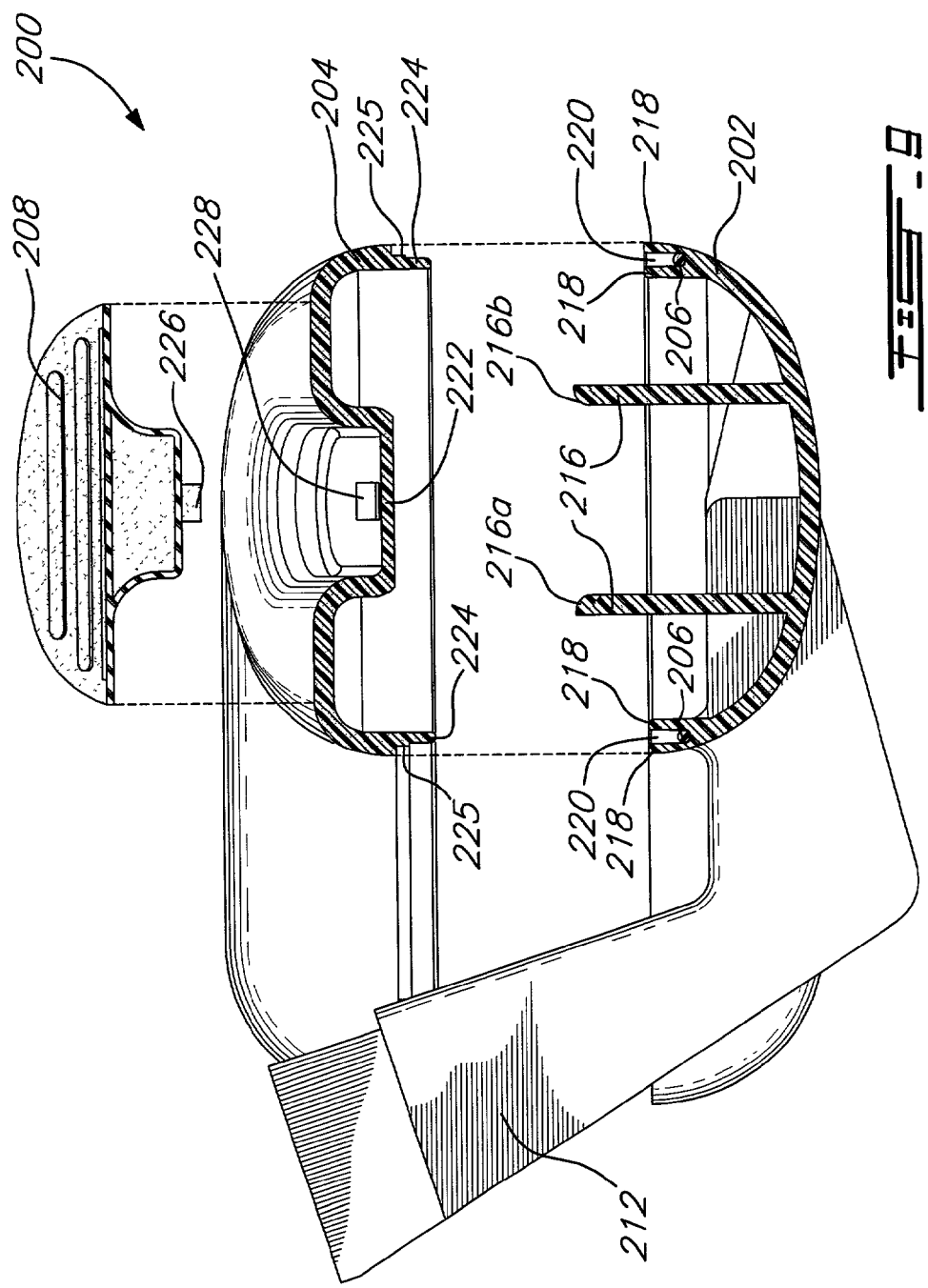

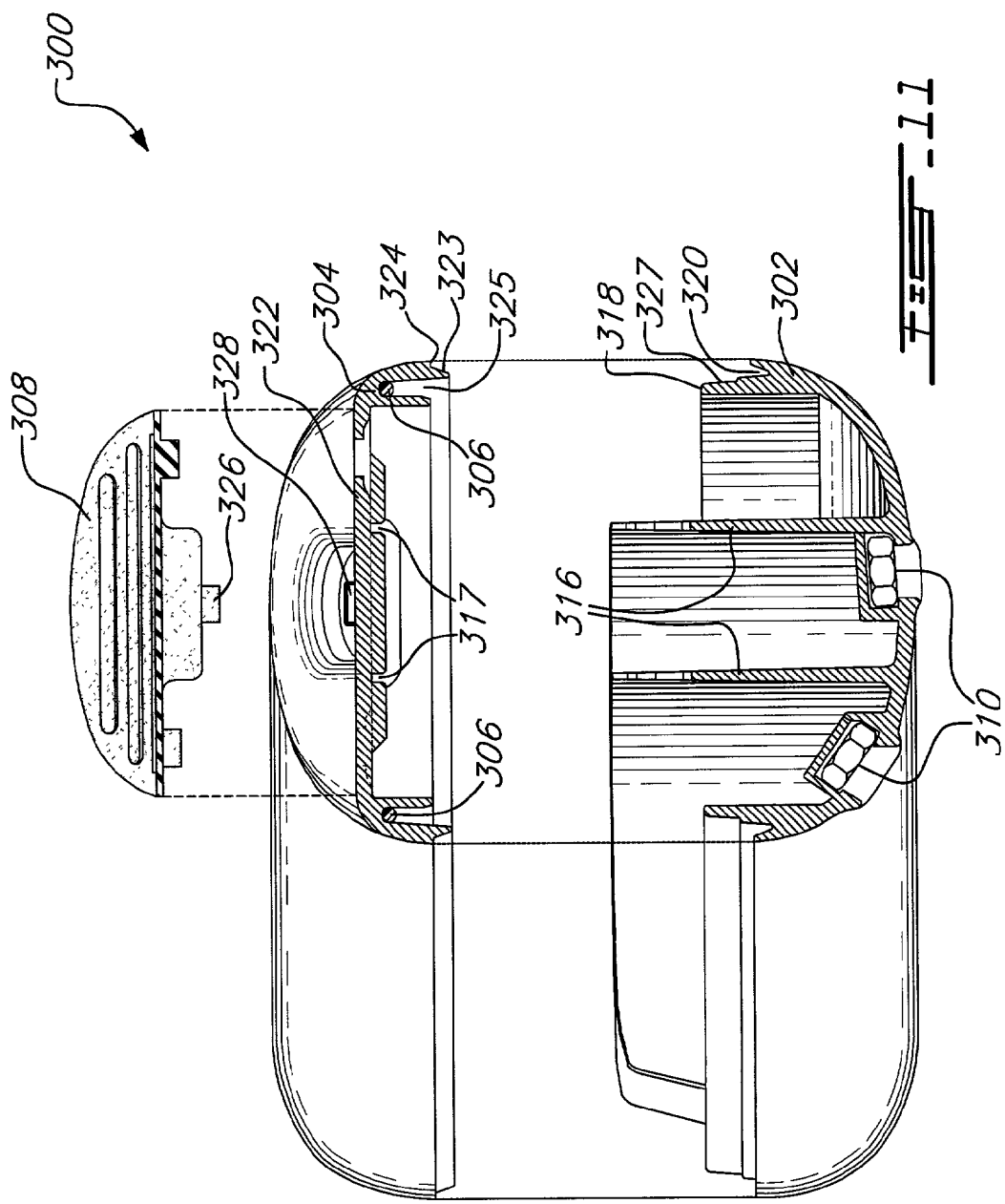

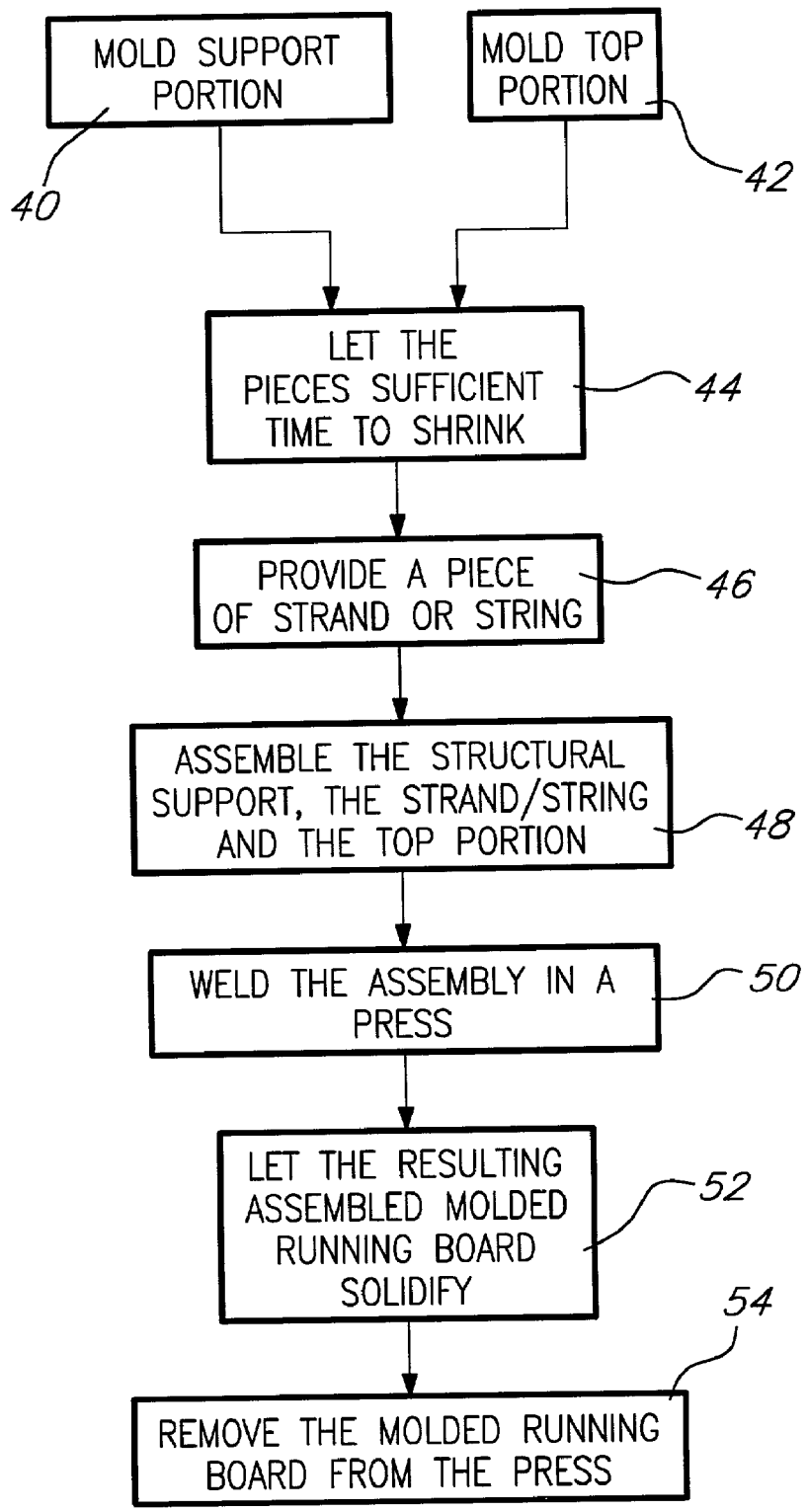

MOLDED RUNNING BOARD

FIELD OF THE INVENTION

The present invention is concerned with molded running boards. More specifically, the present invention relates to a molding running board having a reinforced plastic molded support portion, to which is fixedly mounted a top or step portion also made of plastic material.

BACKGROUND OF THE INVENTION

Running boards are very well known in the art. They are usually mounted to the frames or sill of small trucks such as pick-up trucks and Sport Utility Vehicles (SUVs) or to other vehicles to help the users to get in and out of the vehicle.

Conventionally, these running boards are made of metallic material such as steel, which is finished by chrome plating for example, or painted, both for aesthetic reasons and for protection against a corrosive environment. A drawback of these conventional steel running boards is that they are quite heavy and costly to manufacture.

More recently, running boards having a structural support portion made of coated steel but provided with a plastic top or step portion have been introduced in the market. These bi-material running boards are advantageous since they have a slightly reduced weight compared to conventional running boards and provide a top or step surface with good aesthetic tri-dimensional surface properties.

A drawback of the bi-material running boards is that their weight is still significant and the costs associated with the manufacturing and coating of the structural support portion is still relatively high.

Therefore, there is still a need for running boards that mitigate the above-mentioned drawbacks.

OBJECTS OF THE INVENTION

An object of the present invention is therefore to provide an improved running board comprising molded plactic.

SUMMARY OF THE INVENTION

More specifically, in accordance with an aspect of the present invention, there is provided a molded running board for a vehicle comprising:

a support portion made of a first moldable material; and a second portion made of a second moldable material and fixedly secured to said support portion via welding;

wherein said first moldable material has structural characteristics that are sufficient to provide adequate rigidity to said running board.

In accordance with another aspect of the present invention, there is provided a generally tubular molded running board for a vehicle comprising:

a first generally U-shaped portion made of a moldable material and provided with lateral edges; and a second generally U-shaped portion made of a moldable material and provided with lateral edges;

wherein a) said moldable material has structural characteristics that are sufficient to provide adequate rigidity to said running board; b) said lateral edges of one of said first and second U-shaped portions includes a channel; c) said lateral edges of the other of said first and second U-shaped portions include a projection corresponding to said channel; and d) said projection engages in said channel via welding.

In accordance with a third aspect of the present invention, there is provided a method for making a molded running board comprising the acts of:

molding a support portion;

molding a top portion;

providing at least one piece of thin strand of a material compatible with both the support portion and the top portion;

assembling the top portion to the support portion into an assembly; and welding the assembly under pressure.

In accordance with a fourth aspect of the present invention, there is provided a molded running board for a vehicle comprising:

a rigid support portion made of a first thermoplastic material;

a second portion made of a second thermoplastic material; and an electromagnetic adhesive material interposed between said support portion and said second portion; said adhesive fixedly securing said second portion to said support portion via electromagnetic welding.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 4 is an exploded view of a molded running board according to a second embodiment of the present invention;

FIG. 5 is a perspective bottom view of the molded running board of FIG. 4;

FIG. 6 is a sectional view taken along line 6—6 of FIG. 4;

FIG. 7 is an exploded perspective view of a molded running board according to a third embodiment of the present invention;

FIG. 8 is a perspective view of the support portion of the running board of FIG. 7;

FIG. 9 is a sectional view taken along line 9—9 of FIG. 7;

FIG. 11 is a sectional view taken along line 11—11 of FIG. 10; and

FIG. 12 is a flow chart of the different steps in the production of a molded running board according to the present invention.

DESCRIPTION OF THE PREFERRED EMBODIMENT

Generally stated, the present invention is concerned with the molding of a full size running board having a support portion and a second portion, for example in the form of a top or step portion, that is secured to the support portion. The support portion is advantageously made of a moldable material having structural characteristics that provide adequate rigidity such as, for example, reinforced polypropylene (PP), i.e. polypropylene that has been reinforced with glass fiber for instance, while the top portion may be made of a moldable thermoplastic material such as thermoplastic olefin (TPO).

The present invention is also related to a method for producing a molded running board where the support portion and the second portion are molded separately and then fixedly secured together using, for example, an electromagnetic welding process. Indeed, it has been found that some other known processes to form a plastic material running board are inadequate. For example, extrusion processes do not easily allow the manufacture of objects having varying cross sections or objects that are not straight. Other types of plastic welding such as vibration, ultrasonic, hot plate, infrared, or laser plastic welding processes usually do not yield adequately strong and aesthetic bonds. Furthermore, the diameter of running boards is generally too large to allow gas assisted molding.

Figure 1:
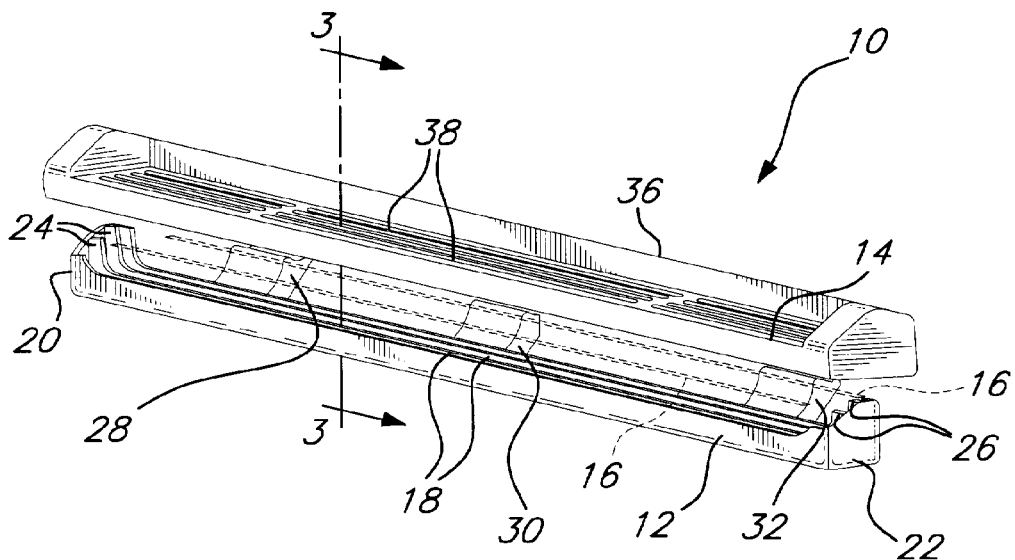
FIG. 1 is an exploded view of a molded running board according to an embodiment of the present invention.
Figure 2:
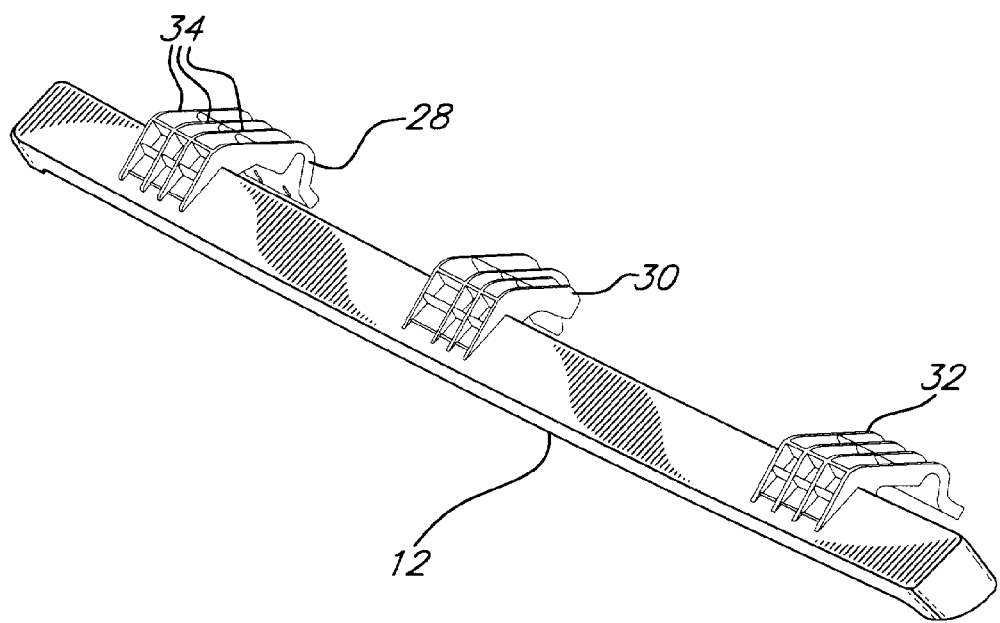
FIG. 2 is a perspective bottom view of the molded running board of FIG. 1.
Figure 3:
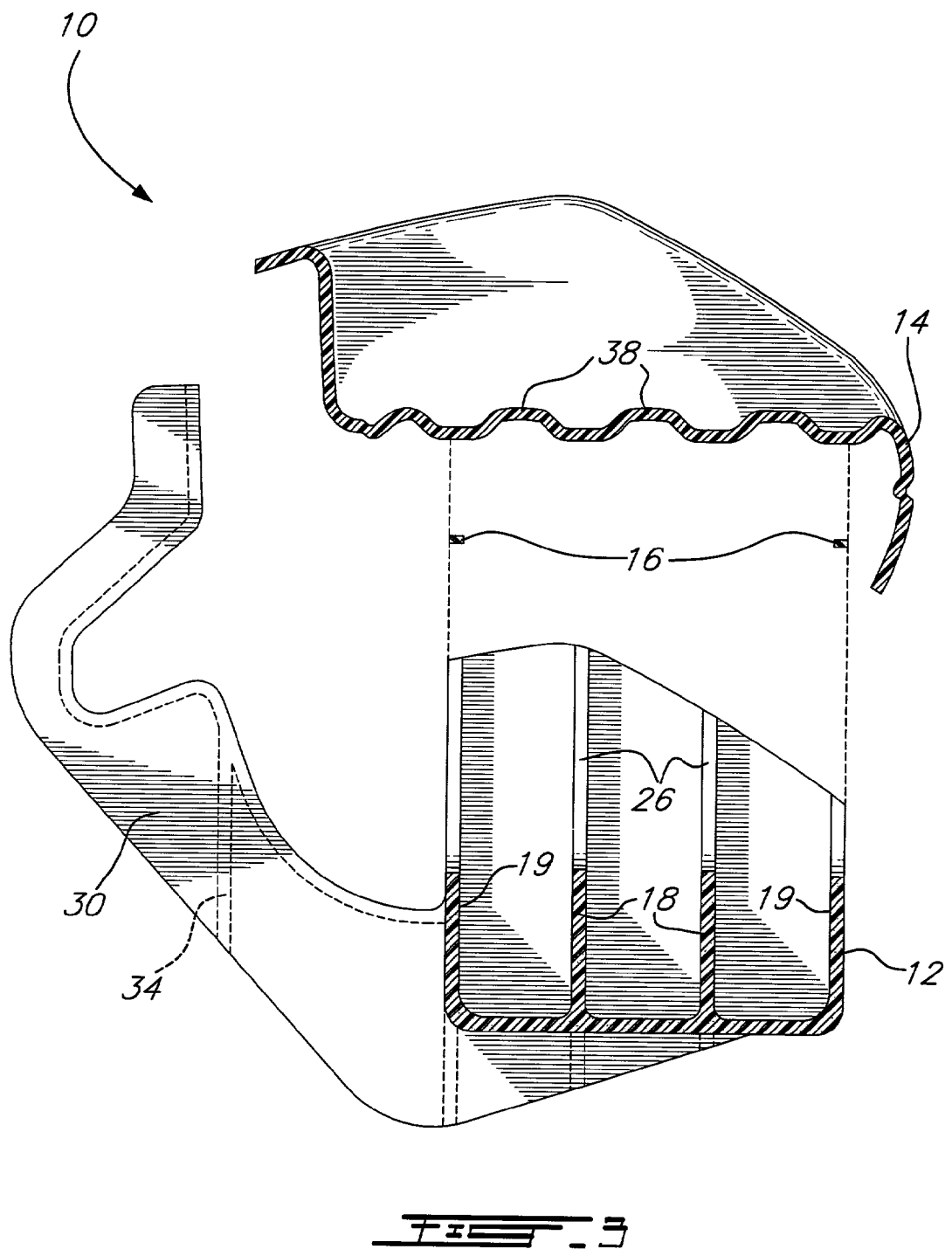
FIG. 3 is a sectional view taken along line 3—3 of FIG. 1.

Turning now more specifically to FIGS. 1 to 3 of the appended drawings, a molded running board 10 according to a first embodiment of the present invention will be described.

The molded running board 10 comprises a structural support portion 12; a top portion 14; and thin strands of an electromagnetic adhesive material 16 provided between the support portion 12 and the top portion 14.

As can be seen from FIG. 1, the support portion 12 is generally open and comprises reinforcing ribs 18 running lengthwise and transverse (not shown), and front and rear ends 20, 22 respectively provided with reinforcing ribs 24 and 26.

Three brackets 28, 30 and 32 are provided to mount the support portion 12 to a vehicle (not shown) for which the running board 10 is intended.

As can be better seen from FIG. 2, the three brackets 28, 30 and 32 are integrally formed with the support portion 12. It is however to be noted that the brackets 28, 30 and 32 could alternatively be formed separately, out of plastic or metal, from the support portion 12 and assembled thereto via fasteners or by an electromagnetic welding method for instance, as will be described hereinbelow.

The brackets 28, 30 and 32 include a matrix of ribs 34, which provide stiffening to the brackets 28, 30 and 32 without unduly increasing the weight thereof, and which does not negatively affect the aesthetic properties of the running board 10.

Referring back to FIG. 1, it can be seen that the top portion 14 is complementarily shaped as to be welded onto the support portion 12 as will be described in detail hereinbelow.

It is to be noted that a top surface 36 of the top portion 14 is provided with friction producing or non-skid ribs 38.

The thin strands of material 16 are provided to fixedly secure the top portion 14 to the support portion 12 as will be described hereinbelow.

The reinforcing ribs 18–26 and 34 as well as the anti-skid ribs 38 may be better seen in FIG. 3. It is apparent from the Figure that the reinforcing ribs 18 optionally have a height slightly larger than that of the edges 19 of the support portion 12. This height difference causes a tension to be applied to the top portion 14 once assembled to the support portion 12 to thereby decrease rattling issues.

Turning now to FIG. 12 of the appended drawings, the main steps in the manufacture of a molded running board according to the present invention will be described.

In a first step 40, a support portion is injection molded in a conventional fashion. According to a specific embodiment of the present invention, the support portion is made of reinforced polypropylene i.e. polypropylene that has been reinforced with glass fiber, talc nanoparticles or other mineral filler for instance. It has been found that the glass reinforced polypropylene made by A. Schulman under the name Polyfort FPP 1239H containing about 30% glass fibers by weight is adequate to mold the support portion.

In a further step 42, which can be carried out simultaneously with step 40, a top portion is molded. Still according to a specific embodiment of the present invention, the top portion is made of TPO. Of course, other suitable materials that can be welded to the support portion, i.e. that are compatible with the material used therefor, could be used.

In step 44, the support portion 12 and the top portion 14 are optionally given time to shrink together. It has been found that 24 hours are sufficient for the support portion and the top portion to reach a stable size.

In step 46, at least one piece of thin strand or string of material is provided. The thin strand or string is advantageously made of a material compatible with both the support portion and the top portion. For example, according to a specific embodiment of the present invention, the thin strand or string of material is made of electromagnetic adhesive comprising polypropylene and ferromagnetic particles. U.S. Pat. No. 3,620,875 issued to Richard J. Guglielmo on Nov. 16, 1971 describes such thin strand or string of electromagnetic adhesive material and is hereby included by reference in its entirety. Of course, other suitable materials that are compatible with both the support portion and the top portion could be used.

Step 48 consists in assembling the support portion, the thin strands of material and the top portion into an assembly.

In step 50, this assembly is put into an electromagnetic press (not shown) which includes a coil surrounding the assembly. An electric generator supplies the coil with a current that causes the metallic particles embedded in the thin strand of material to heat up and melt the polypropylene forming the strand, thus welding the top portion to the support portion. This electromagnetic welding process is described in the above-mentioned U.S. Pat. No. 3,620,875.

The resulting welded running board is kept into the press after the electric generator is shut down to allow sufficient time for a liquefied portion of the running board to solidify (step 52).

Finally, in step 54, a completed molded running board is removed from the electromagnetic press.

It is to be noted that the apertures of the bracket intended to mount the finished running board to the vehicle could be provided with metallic inserts.

Turning now to FIGS. 4 to 6, a molded running board 100 according to a second embodiment of the present invention will be described.

Since the molded running board 100 is very similar to the molded running board 10 illustrated in FIGS. 1 to 3, only the differences therebetween will be discussed in detail hereinbelow.

The molded running board 100 comprises a support portion 102, a top portion 104 and thin strands of material 106. These three elements being substantially as described in relation to the corresponding ones comprised in the molded running board 10 illustrated in FIGS. 1 to 3.

A major difference between the molded running board 100 and the molded running boards 10 can be better seen in FIGS. 5 and 6 where it is clearly shown that a bottom portion of the support portion 102 includes apertures 108. These apertures 108 allow both for a reduction in weight and cost of the support portion 102 and for the drainage of liquid that could enter the molded running board 100.

It is to be noted that the longitudinal ends 110 and 112 of the running board 100 are narrower than the corresponding ends of the running board 10 to further reduce the weight thereof.

The steps of manufacture of the running board 100 are very similar to the steps of manufacture of the molded running board 10, described hereinabove in relation to FIG. 10. It is believed that those skilled in the art can easily apply the method of manufacture of the molded running board 10 to manufacture the running board 100. Therefore, these steps will not be repeated herein.

Turning now to FIGS. 7 to 9 of the appended drawings, a molded running board 200 according to a third embodiment of the present invention will now be described.

As can be better seen from FIG. 9, the molded running board 200 comprises a generally U-shaped cross-section support portion 202, a corresponding, also generally U-shaped, top portion 204, a string of material 206 and a step pad 208 that can be mounted onto the top portion 204. Again, the support portion 202 comprises three brackets 210, 212 and 214 (FIGS. 7 and 8) that allow the molded running board 200 to be mounted to a vehicle (not shown).

The support portion 202 includes reinforcing ribs 216 and edge portions 218 provided with a rectangular channel 220 therein. As can be seen from FIG. 9, the string of material 206 is inserted in the channel 220.

The top portion 204 includes a generally flat undersurface 222 configured and sized to contact and complementarily fit with the free ends 216a and 216b of the reinforcing ribs 216. As discussed hereinabove, the top portion 204 and the support portion 202 are optionally so designed that the free ends 216a and 216b of the reinforcing ribs 216 will exert a pressure on the top portion 204, therefore strengthening the running boards 200 and minimizing the rattling issues.

Edges 224 of the top portion 204 are configured and sized as to enter the channel 220 of the support portion 202. Furthermore, each edge 224 is provided with a projection 225 located on an external surface thereof. The contact between these projections 225 and an internal surface of the channel 220 ensures that, in the case where the plastic material that liquefies during the electromagnetic welding process is to overflow, it overflows towards the inside of the running board 200, leaving the external surface of the running board 200 without unsightly marks or beads.

It is to be noted that both the support portion 202 and the top portion 204 are advantageously made of reinforced plastic material such as for example polypropylene reinforced with glass fibers, as described hereinabove. Alternatively, depending on the specific requirements for the running board, the top portion 204 could be made of non-reinforced material such as, for example, TPO.

It will be easily understood by one skilled in the art that once the support portion 202 and the top portion 204 are welded together using an electromagnetic welding process such as described hereinabove and illustrated in FIG. 12, a strong tubular molded running board 200 will be formed.

The step pad 208 is advantageously made of TPO and may be mounted to the top portion 204 using tabs 226 and corresponding apertures 228 or by any other suitable means. Alternatively, friction ribs (not shown) could be made on the top surface of the element 204 instead of using a step pad 208.

As will be easily understood by one skilled in the art, an advantage of using such the thin strand or string of material 206 provided with metallic particles is that it is possible to weld together even the internal contacting surfaces of the support portion 202 and of the top portion 204 for example.

It is also to be noted that in that specific embodiment, both the support portion 202 and the top portion 204 are structural elements of the molded running board 200.

Figure 10:
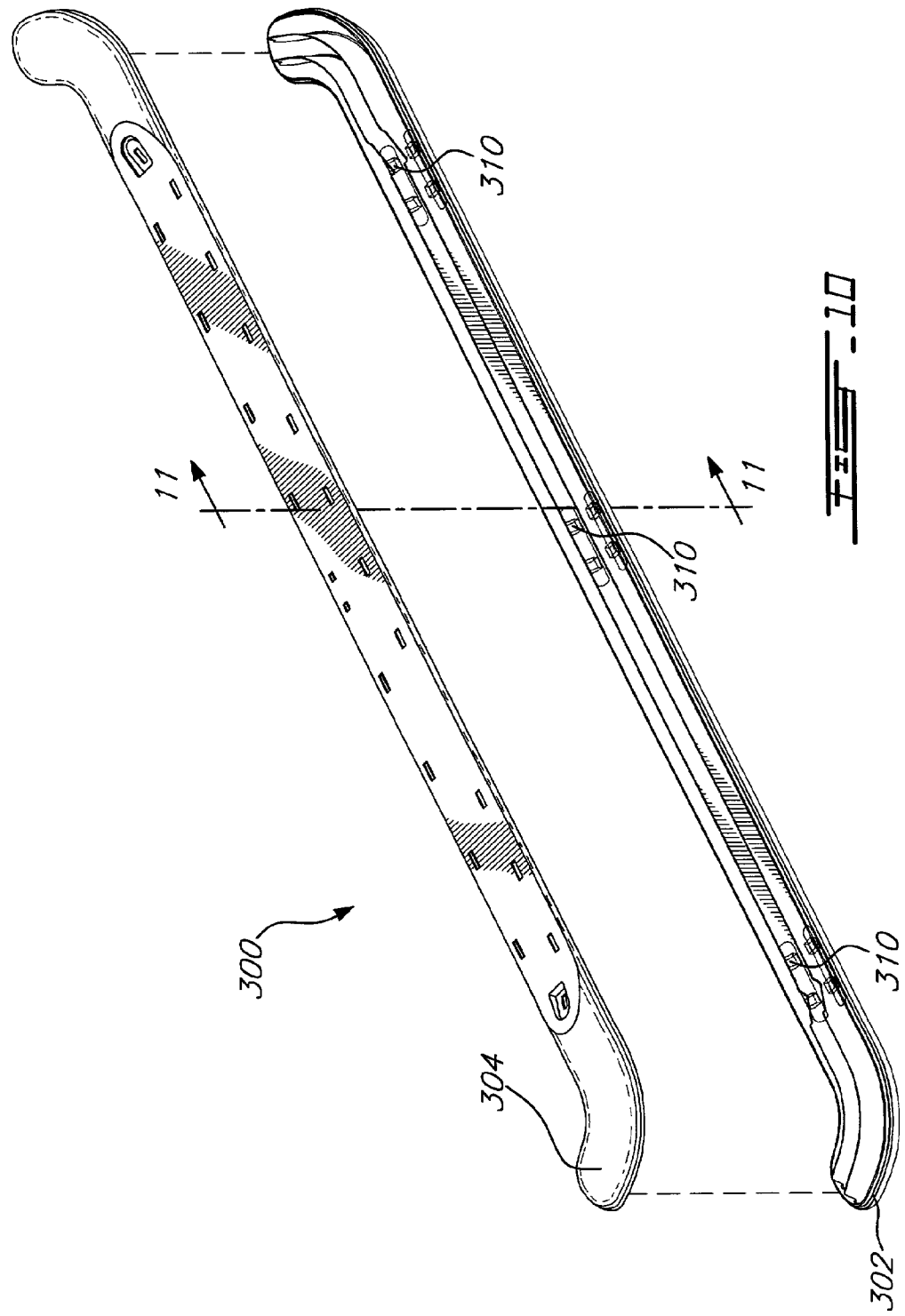
FIG. 10 is an exploded view of a molded running board according to a fourth embodiment of the present invention.

Turning now to FIGS. 10 and 11 of the appended drawings, a molded running board 300 according to a fourth embodiment of the present invention will be described.

Since the molded running board 300 is very similar to the molded running board 200 described in relation to FIGS. 8 to 9, only the differences therebetween will be discussed in detail hereinbelow.

Like the molded running board 200, the molded running board 300 comprises a generally U-shaped cross-section support portion 302, a corresponding generally U-shaped top portion 304, a string of material 306 and a step pad 308 that can be mounted onto the top portion 304.

The support portion 302 includes reinforcing ribs 316 and edge portions 318 provided with an indented profile forming a groove 320 therein.

The top portion 304 includes a large generally flat surface 322, and edges 324 provided with a channel 325 and a projection 323 so configured and sized to correspond to the profile of edge portions 318 of the support portion 302. The string of material 306 is inserted in the channel 325, as can be seen from FIG. 11.

Here again, a contact between the projection 323 and an internal surface of the groove 320, combined with an indentation 327 of the edge portion 318, ensures that in the case when the plastic material that liquefies during the electromagnetic welding process is to overflow, it overflows towards the inside of the running board 300.

The pressure exerted by the reinforcing ribs 316 is distributed on the large generally flat surface 322 of the top portion 204, therefore strengthening the running boards 300.

As can be seen from FIG. 11, the top portion also includes two internal channels 317 in which the reinforcing ribs 316 are positioned when the top portion is assembled to the support portion. These channels 317 are interesting since they prevent lateral movement of the ribs 316, thereby strengthening the assembled running board.

A major difference between the running board 300 and the running board 200 described hereinabove is that the support portion 302 does not include integrally formed brackets to allow the molded running board 300 to be mounted to the vehicle. Instead, the support portion 302 includes standard nuts 310 that are embedded in the plastic material forming the support portion 302. These nuts 310 are used to mount the completed running board to conventional or to custom made brackets (not shown). Of course, other types of mechanical fasteners could be used.

The support portion 302 and the top portion 304 are advantageously made of reinforced plastic material such as for example polypropylene reinforced with glass fibers as described hereinabove. They are welded together using an electromagnetic welding process such as described hereinabove and illustrated in FIG. 12 to yield a tube-like strong molded running board 300. It is to be noted that both the support portion 302 and the top portion 304 are structural elements of the molded running board 300.

The step pad 308 is advantageously made of TPO and may be mounted to the top portion 304 using tabs 326 and corresponding apertures 328 or by any other suitable means. Alternatively, anti-skid ribs could be formed onto the top portion 304.

One skilled in the art will understand that even though the embodiments described hereinabove and illustrated in the appended drawings always have the support portion provided below the top portion, that the portion provided on top could be the support portion and the second portion would be provided below the support portion.

Obvious advantages of a molded running board according to the present invention include:
- a significant reduction of production costs, due to the fact that a limited number of parts are comprised in the molded running board, which further simplifies inventory management;
- a significant reduction of the weight, due mainly to the choice of materials used;
- an enhanced recyclability of parts of the molded running board;
- a range of alternatives are provided, including painting the running board or leaving it as is, or even molding it in a colored plastic;
- an aesthetic surface finish is provided; and
- a range of ways to customize reinforcing ribs of the support portion to obtain the desired stiffness before the electromagnetic welding process.

Although the present invention has been described hereinabove by way of preferred embodiments thereof, it can be modified, without departing from the spirit and nature of the subject invention as defined in the appended claims.

What is claimed is:

1. A molded running board for a vehicle, comprising:
   a molded support member; and
   a molded second member; said molded second member being molded separately and apart from said support member;
   wherein said support member and said second member are welded together; and wherein said support member comprises reinforcing ribs running lengthwise between opposite ends of said support member and lateral edges, and wherein a height of said reinforcing ribs is slightly greater than that of said lateral edges; wherein pressure is applied to a top portion of said second member by said reinforcing ribs.

2. The molded running board according to claim 1, wherein a material of said support member comprises a reinforced polypropylene, and a material of said second member comprises a thermoplastic olefin.

3. The molded running board according to claim 1, wherein a material of said support portion comprises a reinforced polypropylene selected in the group consisting of polypropylene reinforced with glass fibers, polypropylene reinforced with talc nanoparticles and polypropylene reinforced with mineral fillers.

4. The molded running board according to claim 1, wherein said support member is generally open.

5. The molded running board according to claim 1, wherein said support member is provided with apertures on a bottom portion thereof.

6. The molded running board according to claim 1, wherein said second member comprises a top member fixedly secured to said support member.

7. The molded running board according to claim 6, wherein said top member has a step surface provided with non-skid ribs.

8. The molded running board according to claim 6, wherein said support and second members are configured to yield a generally tubular running board, when assembled.

9. The molded running board according to claim 6, wherein said support member has a generally U-shaped cross-section.

10. The molded running board according to claim 9, wherein said second member has a separate step pad mounted thereto.

11. The molded running board according to claim 9, wherein said step pad is made of thermoplastic olefin and includes mounting tabs configured and sized to engage corresponding apertures of said support member.

12. The molded running board according to claim 1, wherein said second member is secured to said support portion via electromagnetic welding.

13. The molded running board according to claim 12, wherein said support member includes edge portions provided with a rectangular channel therein to receive a third material.

14. The molded running board according to claim 13, wherein said second member is further provided with edges configured and sized to be received in said channel.

15. The molded running board according to claim 13, wherein said third material is compatible with said first moldable material and with said second moldable material.

16. The molded running board according to claim 15, wherein said third material melts under an electromagnetic field and bonds said support member with said second member.

17. The molded running board according to claim 15, wherein said third material is an electromagnetic material.

18. The molded running board according to claim 17, wherein said third material comprises polypropylene and ferromagnetic particles.

19. The molded running board according to claim 1, wherein said support member is mountable to the vehicle by at least two brackets.

20. The molded running board according to claim 19, wherein said at least two brackets are integrally formed with said support member.

21. The molded running board according to claim 19, wherein said at least one bracket includes a stiffening matrix of ribs.

22. The molded running board according to claim 19, wherein said at least two brackets are formed separately from said support member in a material selected from the group consisting of thermoplastic material and metal.

23. The molded running board according to claim 22, wherein said at least two brackets are mounted to said support member by means selected from the group consisting of mechanical fasteners and electromagnetic welding.

24. A generally tubular molded running board for a vehicle comprising:
   a first generally U-shaped member molded in a first moldable material and provided with lateral edges;
   a second generally U-shaped member molded in a second moldable material and provided with lateral edges;
   wherein a) said first moldable material has structural characteristics that are sufficient to provided adequate rigidity to said running board; b) said lateral edges of one of said first and second U-shaped members define a channel; c) said lateral edges of the other of said first and second U-shaped members include a projection corresponding to said channel; and d) said projection being secured in said channel; said first and second members being secured together by welding.

25. The generally tubular molded running board according to claim 24, wherein said projection engages in said channel via electromagnetic welding.

26. The generally tubular molded running board according to claim 24, wherein said first moldable material is reinforced with a material selected from the group consisting of glass fiber, talc nanoparticles and mineral fillers, said second moldable material comprises a thermoplastic olefin.

27. The generally tubular molded running board according to claim 26, wherein said first moldable material includes polypropylene.

28. A molded running board for a vehicle comprising:
   a support member molded in a first thermoplastic material;
   a second member molded in a second thermoplastic material; and
   an electromagnetic adhesive material interposed between said support member and said second member;
   wherein said electromagnetic adhesive material fixedly secures said second member to said support member via electromagnetic welding; and
   wherein said support member comprises reinforcing ribs running lengthwise between opposite ends of said support member and said support member includes lateral edges; and wherein a height of said reinforcing ribs is slightly larger than that of said lateral edges and said second member engages both said lateral edges and said reinforcing ribs.

29. The molded running board according to claim 28, wherein said second member comprises a top member.

30. The molded running board according to claim 28, wherein said first thermoplastic material comprises polypropylene reinforced with a material selected from the group consisting of glass fiber, talc nanoparticles and mineral fillers, said second thermoplastic material comprises thermoplastic olefin.

* * * * *

UNITED STATES PATENT AND TRADEMARK OFFICE
CERTIFICATE OF CORRECTION

PATENT NO. : 6,997,469 B2 Page 1 of 1
APPLICATION NO. : 10/163446
DATED : February 14, 2006
INVENTOR(S) : Lanoue et al.

It is certified that error appears in the above-identified patent and that said Letters Patent is hereby corrected as shown below:

On the title page, item: (73) Assignee: insert --IPL Inc., St-Damien-de-Bellechasse (CA)--

Signed and Sealed this

Twenty-fourth Day of April, 2007

JON W. DUDAS
*Director of the United States Patent and Trademark Office*